United States Patent
Fujita

(10) Patent No.: US 8,170,284 B2
(45) Date of Patent: May 1, 2012

(54) APPARATUS AND METHOD FOR DISPLAYING IMAGE OF VIEW IN FRONT OF VEHICLE

(75) Inventor: Ryujiro Fujita, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 1329 days.

(21) Appl. No.: 11/794,974

(22) PCT Filed: Dec. 27, 2005

(86) PCT No.: PCT/JP2005/024225
§ 371 (c)(1),
(2), (4) Date: Jul. 10, 2007

(87) PCT Pub. No.: WO2006/075536
PCT Pub. Date: Jul. 20, 2006

(65) Prior Publication Data
US 2008/0037828 A1 Feb. 14, 2008

(30) Foreign Application Priority Data
Jan. 11, 2005 (JP) .................................. 2005-003974

(51) Int. Cl.
*G06K 9/00* (2006.01)

(52) U.S. Cl. ............. 382/104; 382/106; 382/107; 701/1

(58) Field of Classification Search ................... 382/103, 382/107, 154, 104, 224, 260, 167, 249, 106; 701/1; 340/933, 988; 348/119
See application file for complete search history.

(56) References Cited

U.S. PATENT DOCUMENTS

| 6,285,393 | B1 * | 9/2001 | Shimoura et al. ............. 348/119 |
| 6,483,429 | B1 * | 11/2002 | Yasui et al. .................... 340/435 |
| 7,218,758 | B2 * | 5/2007 | Ishii et al. ..................... 382/104 |
| 2004/0105579 | A1 * | 6/2004 | Ishii et al. ..................... 382/154 |
| 2006/0018509 | A1 * | 1/2006 | Miyoshi et al. ............... 382/104 |

FOREIGN PATENT DOCUMENTS

| JP | 01-263800 | 10/1989 |
| JP | 11-243538 | 9/1999 |
| JP | 11-272849 | 10/1999 |

* cited by examiner

Primary Examiner — Frantz Jean
(74) Attorney, Agent, or Firm — McGinn IP Law Group, PLLC

(57) ABSTRACT

An apparatus and a method for displaying an image of a view in front of a vehicle, each of which detects edges in a monochrome image obtained by a camera, which is mounted on the vehicle and photographs a view in front of the vehicle, to generate an edge image indicative of the detected edges only, determines an object forming an area surrounded with edges in the edge image; and assigns a color to the determined object for each edge-surrounded area of the edge image in order to make an estimated color image.

15 Claims, 6 Drawing Sheets

| FRACTAL DIMENSION VALUE | 0~0.5 | 0.5~1.4 | 1.4~1.6 | 1.6~2.0 |
|---|---|---|---|---|
| SCENERY AREA | SKY | BUILDING | TREE | LEAVES, GRASS |
| BACKGROUND AREA | SKY | TUNNEL | LAND BRIDGE | LEAVES |

| OBJECT | COLOR |
|---|---|
| SKY | LIGHT BLUE |
| BUILDING | COLOR SUCH AS BEIGE AND WHITE IS ASSIGNED RANDOMLY TO BUILDING |
| TREE | BROWN |
| LEAVES, GRASS | GREEN |

APPARATUS AND METHOD FOR DISPLAYING IMAGE OF VIEW IN FRONT OF VEHICLE

TECHNICAL FIELD

The present invention relates to an apparatus and a method for displaying an image of a view in front of a vehicle.

BACKGROUND ART

An apparatus for recognizing white lines on a road or the like for a driver who drives a vehicle at nighttime is already known (see Japanese Patent Laid-Open Publication No. Hei 11-272849). In the apparatus, a camera is mounted on the vehicle to photograph views around the vehicle, and the white lines are recognized by processing images obtained by the camera.

However, a driver who drives a vehicle at nighttime cannot recognize surroundings except for roads even using such a conventional apparatus, and thus may feel uneasy particularly when traveling along a strange road.

DISCLOSURE OF THE INVENTION

The aforementioned problem is an example of problems that the present invention is to solve. It is therefore an object of the present invention to provide an apparatus and a method for displaying an image of a view in front of a vehicle, which can relieve uneasy feeling of a driver who drives a vehicle at nighttime.

A vehicle forward image display apparatus according to the present invention is an apparatus having a camera which is mounted on a vehicle and which photographs a view in front of the vehicle to output a monochrome image, for converting the monochrome image of the view photographed by the camera to an estimated color image so as to display the estimated color image, comprising: edge image generating means for detecting edges in the monochrome image to generate an edge image indicative of the detected edges only; object determining means for determining an object forming an area surrounded with edges in the edge image; and estimated color image making means for assigning a color to the object determined by the object determining means for each edge-surrounded area of the edge image in order to make the estimated color image.

A vehicle forward image display method according to the present invention is a method for converting a monochrome image obtained by a camera, which is mounted on a vehicle and photographs a view in front of the vehicle, to an estimated color image so as to display the estimated color image, comprising the step of: detecting edges in the monochrome image to generate an edge image indicative of the detected edges only; determining an object forming an area surrounded with edges in the edge image; and assigning a color to the determined object for each edge-surrounded area of the edge image in order to make the estimated color image.

DETAILED DESCRIPTION OF THE INVENTION

An embodiment of the invention will be hereinafter explained in detail with reference to the drawings.

Figure 1:
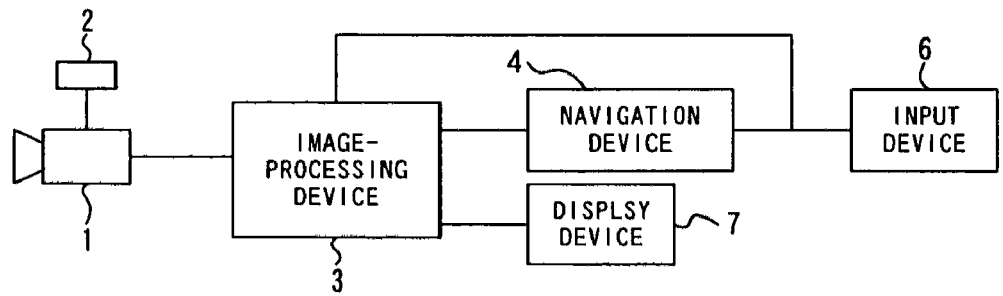
FIG. 1 is a block diagram showing an embodiment of the present invention.

FIG. 1 shows a vehicle forward image display apparatus according to the present invention. The vehicle forward image display apparatus is mounted on a vehicle, and includes a near-infrared camera 1, a near-infrared emitter 2, an image-processing device 3, a navigation device 4, a display device 5, and an input device 6.

The near-infrared camera 1, which is sensitive to near-infrared light at nighttime, is mounted on the vehicle to be capable to photograph a view in front of the vehicle. The near-infrared emitter 2 emits near-infrared light in the direction (in front of the vehicle) of photographing by the near-infrared camera 1. In this embodiment, the near-infrared camera 1 and the near-infrared emitter 2 are formed in one body, but may also be formed separately. The near-infrared camera 1 is connected to the image-processing device 3, so that image data obtained by the near-infrared camera 1 is supplied to the image-processing device 3. Further, the near-infrared camera 1 is controlled together with the near-infrared emitter 2 by the image-processing device 3.

The image-processing device 3 includes, for example, a microcomputer, and receives image data supplied from the near-infrared camera 1 to perform vehicle forward image processing on an image represented by the image data. The image processing will be described in detail later.

The navigation device 4 includes a GPS device, a vehicle operation detection portion, and a processor (which are not shown). The navigation device 4 is configured to detect a current position of the vehicle and a travel direction of the vehicle by the GPS device, to detect operating conditions of the vehicle such as moving speed of the vehicle and rotating speed of an engine by the vehicle operation detection portion, and to allow the processor to perform navigational processing in accordance with the detected outputs.

The display device 5 includes a display monitor on which a result of the vehicle forward image processing performed by the image-processing device 3 or the navigational processing performed by the navigation device 4 is displayed. The input device 6 includes, for example, a keyboard, and supplies a command corresponding to an input operation by a user to the image-processing device 3 and the navigation device 4.

Figure 2:
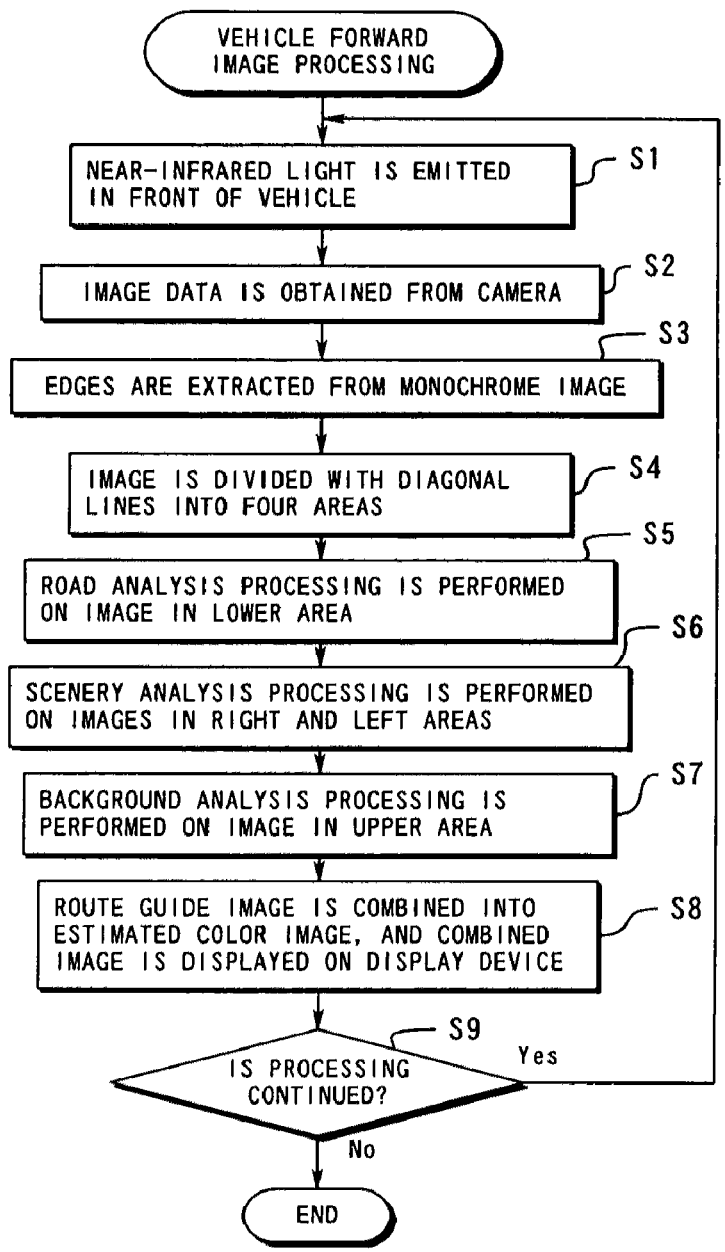
FIG. 2 is a flowchart showing vehicle forward image processing.
Figure 3A:
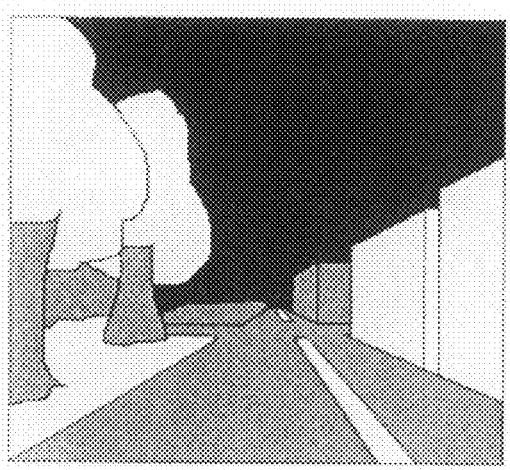
FIGS. 3A and 3B are diagrams showing a monochrome image obtained by a camera and a edge image, respectively.
Figure 3B:
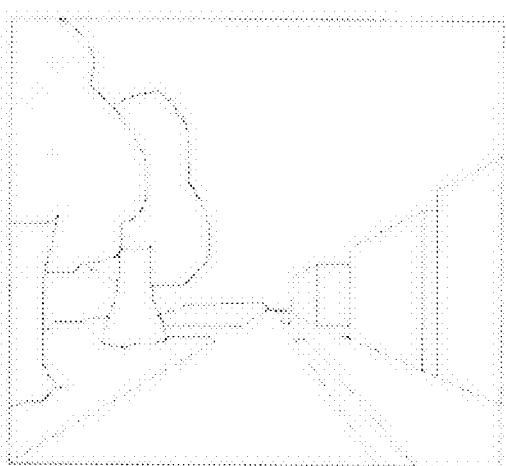

As shown in FIG. 2, in the vehicle forward image processing, the processor (not shown) in the image-processing device 3 issues first a near-infrared emission command to the near-infrared emitter 2 (step S1). In response to the near-infrared emission command, the near-infrared emitter 2 emits near-infrared light in the photographing direction by the near-infrared camera 1. After the near-infrared emission command has been issued, the processor obtains image data from the near-infrared camera 1 (step S2), and then extracts edges from a monochrome image (still picture) represented by the image data (step S3). In step S3, the edges, namely outlines indicative of boundaries of objects, colors and so on in the monochrome image are extracted. For example, when the obtained image data represents a monochrome image as shown in FIG. 3A, an edge-extracted image, or edge image is made as shown in FIG. 3B.

Figure 4:
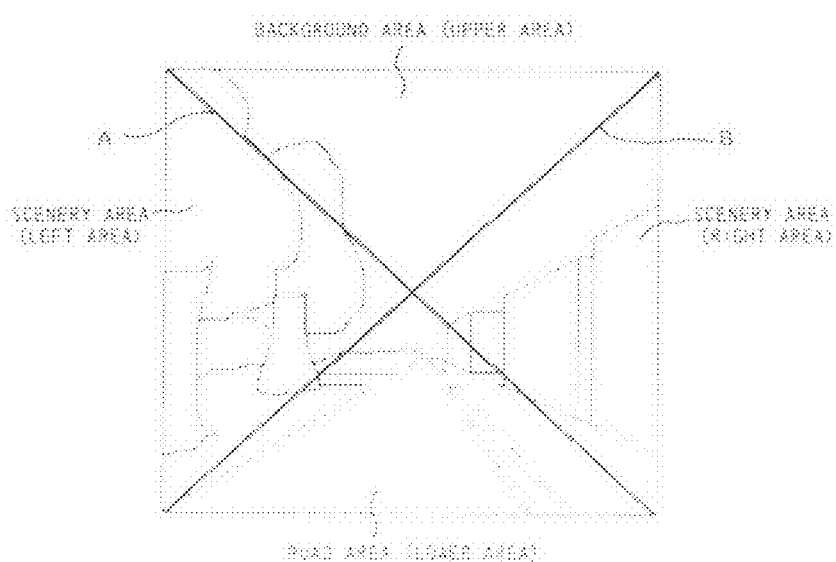
FIG. 4 is a diagram showing a four-division state of the edge image.

The processor divides the edge image into four areas with diagonal lines (step S4). As shown in FIG. 4, the edge image is rectangular and divided with diagonal lines A and B into four areas, i.e., upper, lower, left, and right areas. The upper area is defined as a background area, the lower area as a road area, and the right and left areas as scenery areas. Then, the processor performs road area analysis processing in accordance with the image in the lower area (step S5), scenery area analysis processing in accordance with the images in the right and left areas (step S6), and background area processing in accordance with the image in the upper area (step S7).

Figure 5:
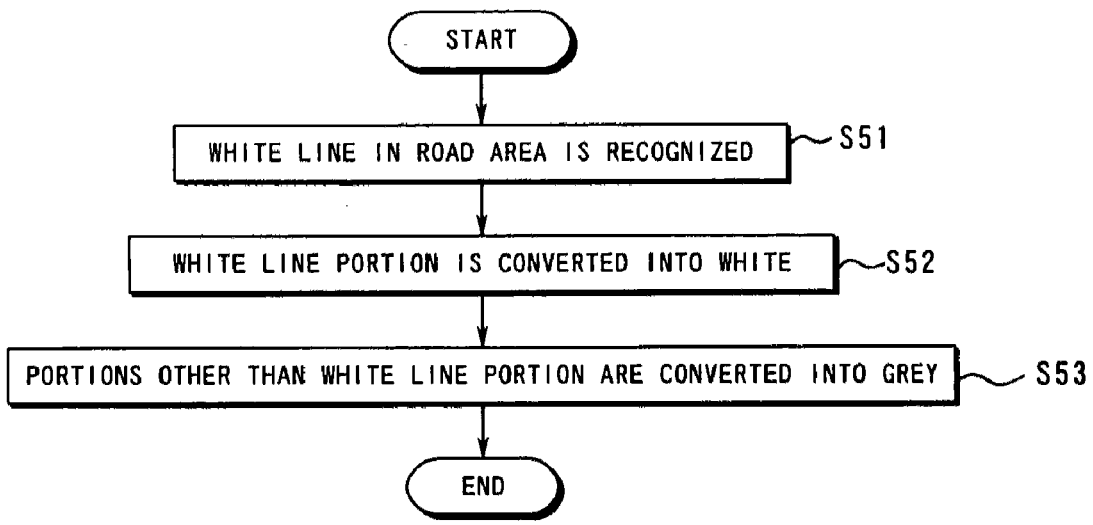
FIG. 5 is a flowchart showing road analysis processing.

As shown in FIG. 5, in the road area analysis processing of step S5, white line recognition is performed in the road area (step S51), a portion of the white line which is recognized in the white line recognition is converted into white color (step S52), and areas surrounded by edges other than the white line portion are converted into grey color (step S53). In other words, the white line on the road is recognized, and the white line portion is converted into white color. Since the other portions surrounded by edges can be considered as asphalt portions, the asphalt portions are converted into grey color.

Figure 6:
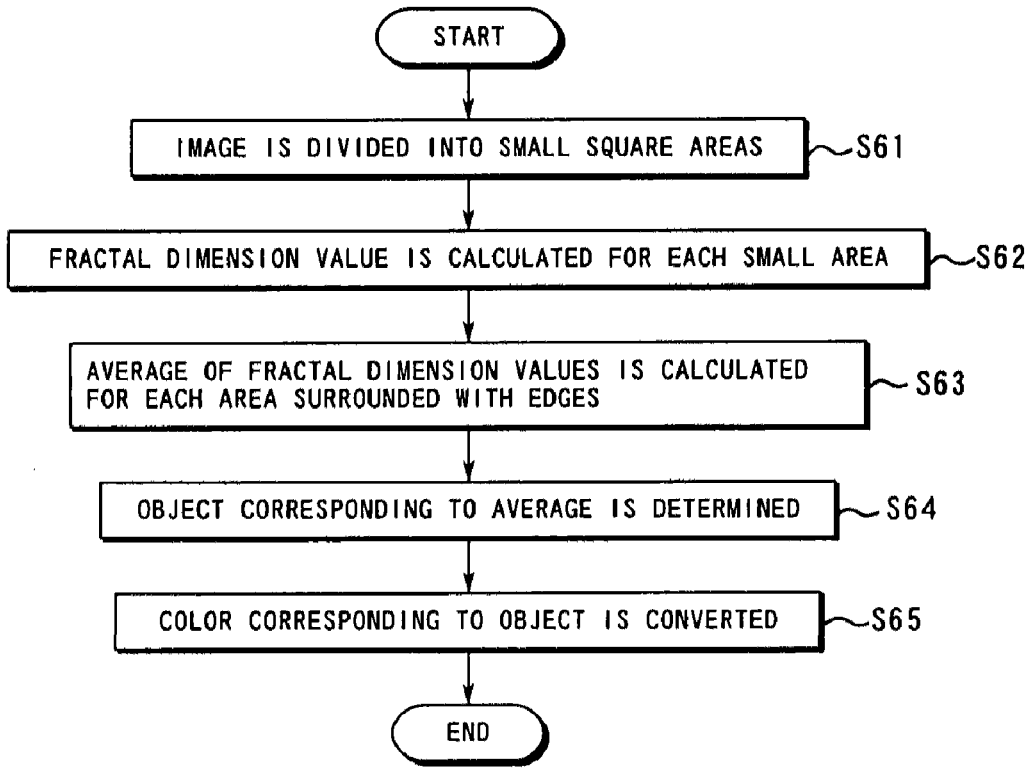
FIG. 6 is a flowchart showing background analysis processing and scenery analysis processing.
Figures 7, 8, 9:
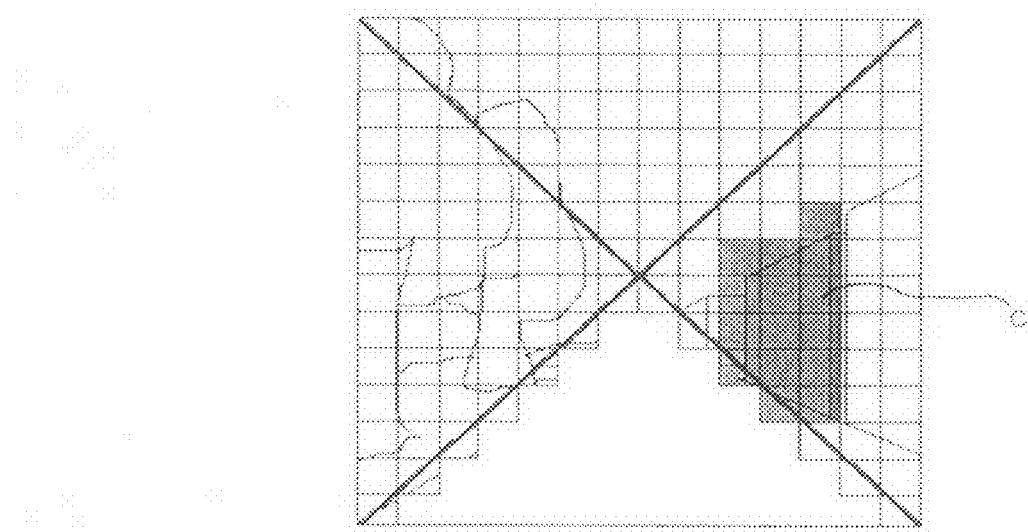
FIG. 7 is a diagram illustrating divisions of background and scenery areas into small areas.
FIG. 8 shows an object table.
FIG. 9 shows a color table.
Figure 10:
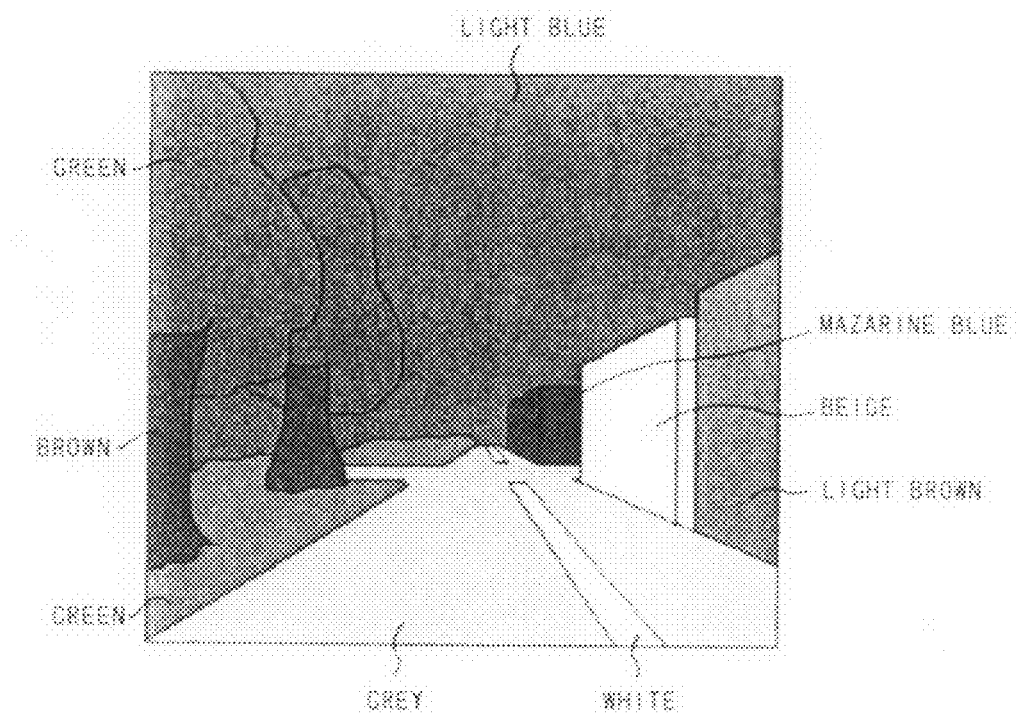
FIG. 10 is a diagram showing an estimated color image.

As shown in FIG. 6, in the scenery area analysis processing of step S6 and the background area analysis of step S7, each of the scenery areas and the background area is divided into small areas (cells) each of which is in a small square (step S61), and then a value of the fractal dimension of each of the small areas is calculated (step S62). For example, on the edge-extracted image as shown in FIG. 3B, the small areas are formed in the scenery areas and the background area as shown in FIG. 7. The fractal dimension analysis is performed on each of the small areas, and as a result, each value of the fractal dimension is obtained. The fractal dimension analysis is described, for example, in Japanese Patent Laid-Open Publication No. 2000-57353. An average value of the fractal dimension values is calculated for each area surrounded with the extracted edges (step S63), the object corresponding to the average value is determined (step S64), and then each edge-surrounded area is converted into the color corresponding to the object (step S65). For example, as shown in FIG. 7, the average value is calculated on fractal dimension values of all the small areas (filled portion C of FIG. 7) in which one object is contained. As shown in FIG. 8, there is a relationship between a fractal dimension value and an object in each of the scenery area and the background area. An object table indicating the relationship is used to determine an object in step S64. Additionally, a relationship between an object and a color is prepared as a color table as shown in FIG. 9, so that the color table is used to perform color conversion of each edge-surrounded area in step S65. For example, when the average fractal dimension value of one edge-surrounded area in the scenery area is 1.1, the area is determined to be a building, and thus the color of the building is set to beige or white on a random basis. FIG. 10 shows an image in which a color is added to each portion of the road area and each edge-surrounded area as a result of the processing of steps S52, S53, and S65 on the edge-extracted image of FIG. 3B. Such an image on which the analysis processing has been performed at each area is a color-added image, i.e., an estimated color image in front of the vehicle. Note that the object table and the color table are previously stored in a memory (not shown) in the image-processing device 3.

After the analysis processing in each of steps S5 to S7, the processor in the image-processing device 3 obtains route guide information from the navigation device 4. The processor then combines an image resulting from the route guide information with the estimated color image, on which the analysis processing has been performed. The combined image is displayed on the display device 7 (step S8).

Figure 11:
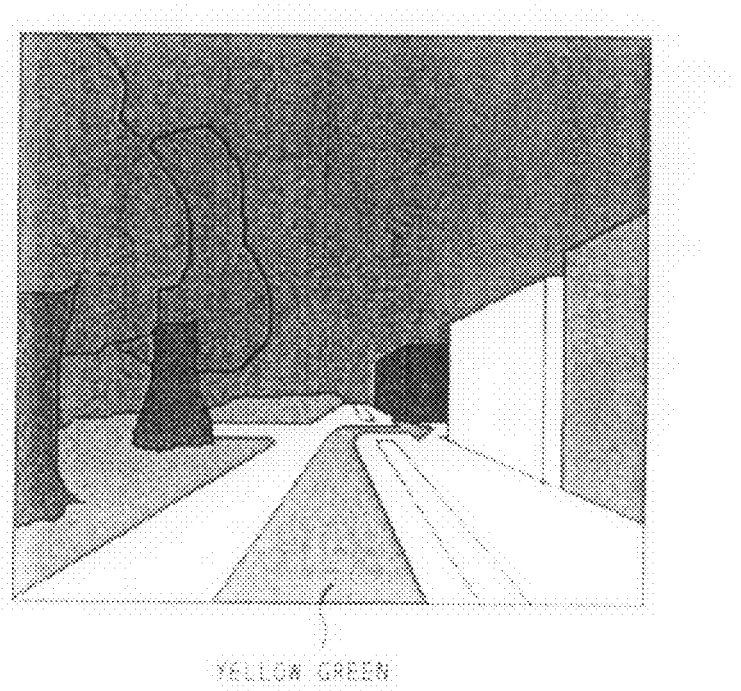
FIG. 11 is a diagram showing an image with a route guide added to a road portion of the estimated color image.

In the navigational processing, a destination is received in accordance with input operation from the input device 6, and a current location and a direction of travel of the vehicle are obtained as data from the GPS device to calculate a route from the current location to the destination location. The calculated route is supplied as route guide information to the image-processing device 3. In step S8, the route represented by the route guide information is added to the road portion of the estimated color image. For example, as shown in FIG. 11, displayed on the display device 7 is an arrow image (yellow green) which is indicative of the route and combined with the road portion of the estimated color image.

After step S8 has been performed, it is determined whether the vehicle forward image processing is continued or not (step S9). For example, if it is continued in accordance with input operation from the input device 6, the process returns to step S1 to repeat steps S1 to S9 as mentioned above. On the other hand, if it is not continued, the vehicle forward image processing is ended.

In the aforementioned embodiment, edges are extracted from the monochrome image obtained by the near-infrared camera 1 not only to easily recognize an object but also to convert the road into grey color and buildings and trees into appropriate colors. It is thus possible to provide a route guide image that can be readily understood by a user such as a driver. Additionally, since the monochrome image obtained by the near-infrared camera 1 is converted into a color image, the apparatus is available for use even at nighttime. Further, it is also possible to provide a nearly daytime image in real time even at nighttime.

Additionally, in the aforementioned embodiment, an object is determined based on a fractal dimension and then colored to suit the object. An estimated color image is thus obtained, thereby making it possible for the user to easily identify the object on the estimated color image.

Figure 12:
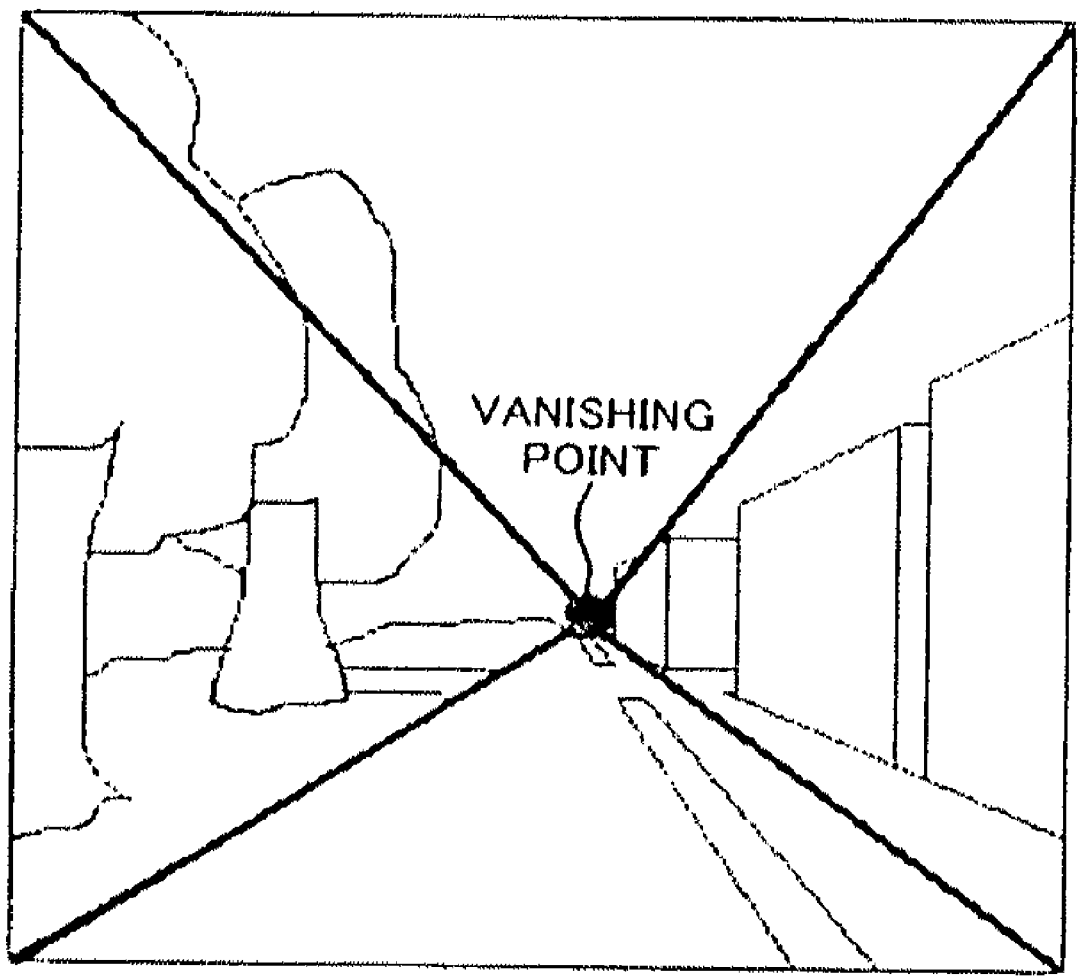
FIG. 12 is a diagram showing four-division of the edge image from a vanishing point.

Furthermore, in step S4 of the aforementioned embodiment, the edge-extracted image is divided with diagonal lines into the road area, the right and left scenery areas, and the background area. As a method for dividing the image into the four areas, the image may also be divided into a plurality of areas on a vanishing point of the road in front of the vehicle. A method as disclosed in Japanese Patent Laid-Open Publication No. Hei 08-159716 can be employed in which a white line is recognized on an image obtained by photographing to thereby determine a vanishing point. That is, as shown in FIG. 12, the image can be divided into four areas with straight lines connecting from the vanishing point to the four corners of the image, so that the lower area is set as the road area, the right and left areas as the scenery areas, and the upper area as the background area for analysis. Due to the position of attachment of the near-infrared camera and swing of the vehicle or the near-infrared camera during its travel, since the vanishing point of an image obtained by the camera deviates from the center of intersection of two diagonal lines, there is a case in which the image is not properly divided into the four areas with the diagonal lines. This problem can be properly dealt with by dividing the image into the four areas on the vanishing point.

Additionally, in the aforementioned embodiment, the near-infrared camera is used at nighttime to photograph a view in front of the vehicle and thereby obtain a monochrome image. Alternatively, an ordinary camera may also be used at daytime to photograph a view in front of the vehicle and thereby obtain a monochrome image, which is then converted into an estimated color image.

Furthermore, as a method for adding a color to an object portion, colors may be added relatively by using a color corresponding to luminance information of an image by the near-infrared camera. Furthermore, another vehicle running ahead of the vehicle may be recognized on a monochrome image obtained from the camera and then colored as an automobile. Although a night-vision camera has poor color reproduction, the present invention is also applicable even in a case where such a camera is employed. Furthermore, to express the surface texture of an object, textures may be added to an image so that it looks more realistic.

As described above, the apparatus of the present invention comprises: edge image generating means for detecting edges in a monochrome image obtained by a camera, which photographs a view in front of a vehicle, to generate an edge image indicative of the detected edges only; object determining means for determining an object forming an area surrounded with edges in the edge image; and estimated color image making means for assigning a color to the object determined by the object determining means for each edge-surrounded area of the edge image in order to make an estimated color image. Therefore, a driver of the vehicle can view the estimated color image in front of the vehicle. By using the apparatus, it is possible to relieve uneasy feeling of a driver who travels along a strange road.

The invention claimed is:

1. An apparatus for converting a monochrome image to an estimated color image so as to display the estimated color image, the apparatus comprising:
  a camera which is configured to be mounted on a vehicle and which photographs: a view from the vehicle and outputs the monochrome image which includes a background, a road, a left view, and right view;
  an edge image generating portion which detects edges in the monochrome image to generate an edge image indicative of the detected edges only;
  a four-division portion which divides the edge image into four areas, an upper area corresponding to the background, a lower area corresponding to the road, a left area corresponding to the left view and a right area corresponding to the right view with two cross lines;
  a white line recognizing portion which recognizes a white line on the road in accordance with the edge image in the lower area;
  an object determining portion which determines an object forming the edge image in each of the upper, left and right areas; and
  an estimated color image making portion which assigns a color to each white line recognized by the white line recognizing portion and the object determined by the object determining portion for each of the upper, left and right areas in order to make the estimated color image.

2. The apparatus according to claim 1, wherein said object determining portion includes:
  a fractal dimension analysing portion which performs fractal dimension analysis on the edge image for each of the edge image in the upper, left and right areas; and
  an object specifying portion which specifies an object corresponding to an analysed result of the fractal dimension analysis for each of the edge image in the upper, left and right areas, and
wherein said estimated color image making portion includes:
  a converting portion which converts a portion of the white line on the road in the lower area recognized by said white line recognizing portion into a white color and converts a portion other than the white line portion on the road into a gray color; and
  a color setting portion, having a color table indicative of correspondence relations between objects and colors, which sets a color corresponding to an object specified by said object specifying portion using the color table to convert a portion of the object of the edge image into the set color.

3. The apparatus according to claim 2, wherein said fractal dimension analysing portion includes:
  a small-area division portion which divides the upper, left and right areas into small square areas;
  a fractal dimension calculating portion which calculates a fractal dimension value for each of the small square areas; and
  an average calculating portion which calculates an average value of fractal dimension values calculated by said fractal dimension calculating portion for each edge-surrounded area to obtain the average value as the analysed result.

4. The apparatus according to claim 2, wherein said object specifying portion has the color table indicative of correspondence relations between, various objects and colors for each of the lower, left and right areas, and specifies, using the color table, an object corresponding to a fractal dimension value analysed by said fractal dimension analysing portion.

5. The apparatus according to claim 1, wherein the two cross lines comprise two diagonal lines.

6. The apparatus according to claim 1, wherein the four-division portion divides the edge image into the four areas with lines connecting from a vanishing point of the road to four corners of the edge image.

7. The apparatus according to claim 1, wherein said camera comprises a near-infrared camera which photographs a view in front of the vehicle, and includes a near-infrared emitter that emits near-infrared light in a direction of photographing by said near-infrared camera.

8. The apparatus according to claim 1, further comprising:
  a combining portion which combines a route guide image of a navigation device with the estimated color image made by said estimated color image making portion; and
  display portion which displays a combined image by said combining portion.

9. The apparatus according to claim 1, wherein the camera is configured to be mounted on a front of the vehicle.

10. The apparatus according to claim 1, wherein the object determining portion determines the object based on an object table.

11. The apparatus according to claim 1, further comprising a storage device which stores a color table that correlates colors to objects.

12. The apparatus according to claim 1, wherein the object determining portion comprises a fractal dimension analyzing portion that calculates an average value of a plurality of fractal dimension values of the edge image.

13. The apparatus according to claim 12, wherein the average value of the plurality of fractal dimension values is used to determine the object.

14. The apparatus according to claim 12, wherein the estimated color image making portion assigns the color to the object based on the average value of the plurality of fractal dimension values.

15. A method for converting a monochrome image to an estimated color image so as to display the estimated color image, the method comprising:

obtaining the monochrome image with a camera, which is configured to be mounted on a vehicle and photographing a view from the vehicle, and the monochrome including a background, a road, a left view, and a right view;

detecting edges in the monochrome image to generate an edge image indicative of the detected edges only;

dividing the edge image into four areas, an upper area corresponding to the background, a lower area corresponding to the road, a left area corresponding to the left view and a right area corresponding e right view with two cross lines;

recognizing a white line on the road in with accordance with the edge image in the lower area;

determining an object forming the edge image in each of the upper, left, and right areas; and assigning a color to each white line recognized on the road and the object determined by the forming of the edge image for each of the upper, left and right areas in order to make the estimated color image.

\* \* \* \* \*